United States Patent Office 3,565,893
Patented Feb. 23, 1971

3,565,893
PREPARATION OF 2-(4-STILBYL) NAPHTHOTRIAZOLES
Albert F. Strobel, Delmar, and Sigmund C. Catino, Castleton, N.Y., assignors to GAF Corporation, New York, N.Y., a corporation of Delaware
No Drawing. Filed July 23, 1968, Ser. No. 746,755
Int. Cl. C07d 55/04
U.S. Cl. 260—240                 5 Claims

ABSTRACT OF THE DISCLOSURE

In a process for preparing 2-(4'-stilbyl)naphthotriazoles useful as brightening agents, wherein a diazotized 4-amino-stilbene is coupled with a naphthylamine to produce an intermediate azo compound, the use of a system comprising cupric chloride to effect the oxidation and ring closure of the intermediate azo compound to produce 2-(4-stilbyl)naphthotriazole. The cupric chloride is employed in conjunction with isopropanol.

---

The present invention relates to a new and improved process for preparing 2-(4-stilbyl)naphthotriazoles and more particularly to a new and improved method of effecting the oxidation or ring closure of an azo intermediate prepared by coupling a diazotized 4-aminostilbene with a naphthylamine.

2-(4-stilbyl)naphthotriazoles are useful compounds for the brightening of fabrics etc. Such compounds are conventionally prepared by the coupling of a diazotized 4-aminostilbene with a naphthylamine, i.e. β-naphthylamine, with subsequent oxidation or ring closure of the azo intermediate to produce the desired 2-(4-stilbyl)naphthotriazole.

Various oxidizing agents have been conventionally employed to accomplish such oxidation or ring closure of the azo intermediate compound in the production of the desired 2-(4-stilbyl)naphthotriazole. Thus, for example, the use of cupric salts in aqueous alkaline medium, especially employing ammonium hydroxide as the alkalizing agent, is a well known method. Also, the use of cupric salts in pyridine or picoline medium is a further method well known for the ring closure or oxidation of an intermediate azo compound in the production of brightening agents. Sodium hypochlorite in aqueous medium is also frequently employed while hydrogen peroxide, lead peroxide, manganese dioxide, oxygen, sodium dichromate, and other oxidizing agents have all been suggested and employed to a lesser or greater extent. While all of these systems do effect the oxidation or ring closure of the intermediate azo compounds they all have the fault or disadvantage of failing to produce a product having a high degree of purity. It is obvious that to be useful as a brightening agent the product produced from the ring closure or oxidation reaction must be essentially colorless. By the processes previously employed, however, it is practically impossible to obtain consistently light or colorless products since there is generally a reddish color present due to the presence of the azo intermediate or its colored lake with cuprous ions.

In accordance with the present invention, however, it has now been discovered that it is possible to obtain a triazole brightening agent by a ring closure or oxidation reaction which is a consistently pure white color. This is accomplished by employing an oxidizing system comprising cupric chloride with isopropanol.

It is therefore a principal object of the present invention to provide a novel process for the production of 2-(4-stilbyl)naphthotriazoles which is free from the inherent faults and disadvantages of prior processes.

It is still a further object of the present invention to provide such a novel process for the production of 2-(4-stilbyl)naphthotriazoles wherein the ring closure or oxidation of an azo intermediate produced by the coupling of a diazotized 4-aminostilbene with a naphthylamine is accomplished in the presence of cupric chloride and isopropanol.

It is yet a further object of the present invention to provide a process for the production of 2-(4-stilbyl)naphthotriazoles of consistently pure white color by effecting the ring closure of an intermediate azo compound with a system comprising cupric chloride and isopropanol.

Still further objects and advantages of the process of the present invention will become more apparent from the following more detailed description of the present invention.

The 2-(4-stilbyl)naphthotriazoles prepared in accordance with the process of the present invention correspond to the formula:
(I)

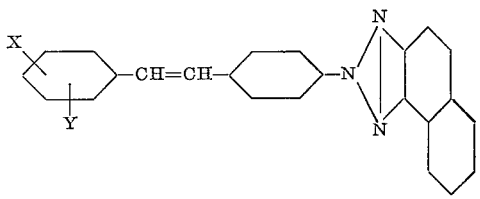

wherein X and Y are independently selected from hydrogen and chlorine. Exemplary compounds produced in accordance with the present invention are as follows:

2-(4-stilbyl)naphthotriazole
2-(2'-chloro-4-stilbyl)naphthotriazole
2-(4'-chloro-4-stilbyl)naphthotriazole
2-(2',4'-dichloro-4-stilbyl)naphthotriazole, etc.

The general method of preparing compounds such as 2-(4-stilbyl)naphthotriazoles is to diazotize a 4-aminostilbene and couple the same with β-naphthylamine to produce an intermediate azo compound having the formula:
(II)

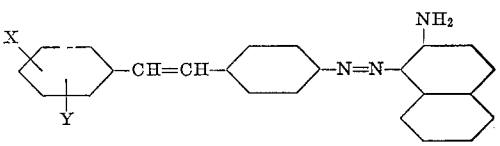

wherein X and Y have the same values as discussed above. The 2-(4-stilbyl)naphthotriazoles of Formula I are produced from the intermediate azo compound by effecting the ring closure of such compound by oxidizing. In accordance with the present invention the oxidation of the azo intermediate compound of Formula II is accomplished by combining with the intermediate azo compound a system comprising cupric chloride and isopropanol. The cupric chloride is generally employed in an amount of approximately 2 moles of cupric chloride per 1 mole of intermediate azo compound, although an excess of cupric chloride of up to 15% on a molar basis can be advantageously employed. The isopropanol is generally employed in an amount of from about 1 mole to 2 moles of isopropanol per 1 mole of intermediate azo compound.

The isopropanol employed may be pure isopropanol or the isopropanol may be employed in admixture with up to 30% by weight of additional solvents. Suitable additional solvents include for example aromatic hydrocarbons such as benzene, toluene, xylene, chlorinated aromatic hydrocarbons such as chlorobenzene, alcoholic solvents such as ethanol, 1-propanol, 1- and 2-butanol, and tertiary butanol, and ketonic solvents such as acetone, methyl ethyl ketone and diethyl ketone etc.

The ring closure or oxidation of the azo intermediate compound of Formula II is effected by slowly heating the charge comprising the intermediate azo compound with cupric chloride and isopropanol with a maintaining of the system below the boiling point thereof for several hours, generally, from 2 to about 10 hours. The system is then refluxed for several more hours, generally from about 5 to about 10 hours. The acidic charge may then be neutralized by the addition of an alkalizing agent, for example, sodium acetate. While this is the generally preferred material for the neutralization of the acidic charge, other suitable materials such as sodium formate, sodium propionate and the like may be advantageously employed. After neutralization, the charge is cooled, filtered and washed to produce the desired product. Additionally, the product may be re-crystallized from a suitable solvent therefor if desired. By employing the process of the present invention a high yield of product having consistently high degree of purity is obtained. In addition to effecting a high yield of product having a high degree of purity, the system of the present invention is further advantageous since, unlike other systems wherein pyridine or picoline is employed, the system of the present invention has no obnoxious odor to affect its acceptability.

The isopropanol that is employed in the system can be recovered and re-used with very little loss of solvent. Such recovering of the isopropanol can be accomplished by any conventional distillation or similar procedure. As noted above, the compounds produced in accordance with the process of the present invention are effective brightening agents employed in conjunction with both natural and synthetic fibers and filaments and various plastic materials. Since the products produced in accordance with the present invention have a consistent degree of high purity, there is little likelihood that the products can discolor the medium in which they are employed and thus the effectiveness of the 2-(4-stilbyl)naphthotriazoles is increased.

The diazotization of the 4-aminostilbene employed as a reactant in the coupling reaction of the present invention can be accomplished by any conventional method for diazotizing such materials and similar materials. Thus, for example, a conventional and generally employed method comprises the employment of nitric acid to diazotize hydrochloric acid solution of the 4-aminostilbene. It is to be understood that any conventional method of producing the azo compound is encompassed by the present invention, which present invention is directed primarily to a novel method of effecting the oxidation or ring closure of the azo intermediate compound in the production of the desired 2-(4-stilbyl)naphthotriazole.

The following examples illustrate various embodiments of the present invention. It is to be understood that such are for purposes of illustration only and the present invention is in no way to be deemed as limited thereto.

EXAMPLE 1

Some 16 g. ground 1-(4-stilbyl)azo-2-naphthylamine, 18 g. cupric chloride·2H$_2$O and 80 cc. isopropanol were combined, heated slowly to and held at 75° C. for 3 hours, then refluxed at 82° C. for 6 hours. 7 g. sodium acetate anhyd. was added at 82° C. and heating continued at this temperature for 8 hours. The charge was cooled to room temperature, filtered, washed with 16% sodium chloride solution containing 2% HCl at 95° C. until copper free, then with water. The melting point of this white product was 174–176° C., the yield 95%, purity 98%. It was recrystallized from benzene to give a product having a M.P. of 177° C.

EXAMPLE 2

Some 18 g. ground 1-(2'-chloro-4-stilbyl)azo-2-naphthylamine, 18 g. CuCl$_2$·2H$_2$O, 70 cc. isopropanol and 10 cc. toluene were combined, heated slowly to and held at 75° C. for 3 hours, then refluxed for 6 hours. The charge was then finished as in Example 1. A white product, M.P. 175–176.6° C. was obtained in excellent yield.

EXAMPLE 3

Some 18 g. ground 1-(4'-chloro-4-stilbyl)azo-2-naphthylamine, 18 g. CuCl$_2$·2H$_2$O, 70 cc. isopropanol and 10 cc. benzene were combined and processed as in Example 2. A white produce, K$_{max}$ 138.75 at 362 m$\mu$ was obtained in high yield.

EXAMPLE 4

Some 19.5 g. ground 1-(2',4'-dichloro-4-stilbyl)azo-2-naphthylamine, 18 g. CuCl$_2$·2H$_2$O, 64 cc. isopropanol and 16 cc. toluene were combined and processed as in Example 2. A white product, M.P. 221.4–222.4° C. was obtained in high yield.

The foregoing examples clearly illustrate the effectiveness of the process of the present invention in the production of 2-(4-stilbyl)naphthotriazoles of high yield and high degree of purity. Such high yield and high degree of purity of the desired 2-(4-stilbyl)naphthotriazole compound is produced in accordance with the present invention by the conjoint employment of cupric chloride and isopropanol as an oxidation or ring closure system for the azo intermediate compound, such isopropanol being employed with or without additional solvent materials.

While the present invention has been described specifically with respect to the foregoing examples, it is to be understood that the present invention is in no way to be deemed as limited thereto but should be construed as broadly as all or any equivalents thereof.

We claim:

1. In a process for producing 2-(4-stilbyl)naphthotriazoles wherein an intermediate azo compound produced by coupling a diazotized 4-aminostilbene with a naphthylamine is oxidized to the desired 2-(4-stilbyl)naphthotriazole in a ring closure reaction, the improvement which consisting essentially of effecting the ring closure by heating said intermediate azo compound in the presence of cupric chloride and isopropanol, said cupric chloride being present in an amount of about 2 moles per mole of intermediate azo compound.

2. In the process of claim 1 wherein said isopropanol is present in an amount of about 1 to 2 moles per mole of intermediate azo compound.

3. In the process of claim 2 wherein said isopropanol is present in admixture with up to 30% of additional solvents.

4. In the process of claim 1 wherein said cupric chloride is present in an amount of up to about a 15% molar excess based on the utilization of 2 moles of cupric chloride per 1 mole of intermediate azo compound.

5. In the process of claim 1 wherein said 2-(4-stilbyl)-naphthotriazole corresponds to the formula:
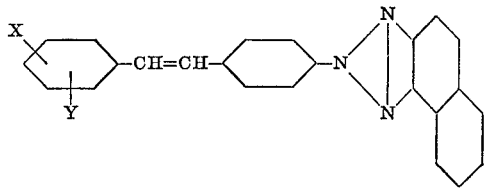
wherein X and Y are independently selected from hydrogen and chlorine.
References Cited
UNITED STATES PATENTS
3,320,231  5/1967  Ammann et al. ____ 260—308X
3,401,048  9/1968  Okubo et al. _____ 260—240X
FOREIGN PATENTS
1,262,740  4/1961  France _____ 260—240
JOHN D. RANDOLPH, Primary Examiner
U.S. Cl. X.R.
260—196